(12) United States Patent
Choi

(10) Patent No.: US 10,723,197 B2
(45) Date of Patent: Jul. 28, 2020

(54) AIR CONDITIONING SYSTEM FOR MOTOR VEHICLES

(71) Applicant: Hanon Systems, Daejeon (KR)

(72) Inventor: Ei Hyun Choi, Daejeon (KR)

(73) Assignee: HANON SYSTEMS, Daejeon (KR)

(*) Notice: Subject to any disclaimer, the term of this patent is extended or adjusted under 35 U.S.C. 154(b) by 272 days.

(21) Appl. No.: 15/548,949

(22) PCT Filed: Jan. 28, 2016

(86) PCT No.: PCT/KR2016/000901
§ 371 (c)(1),
(2) Date: Aug. 4, 2017

(87) PCT Pub. No.: WO2016/129832
PCT Pub. Date: Aug. 18, 2016

(65) Prior Publication Data
US 2018/0022183 A1     Jan. 25, 2018

(30) Foreign Application Priority Data

Feb. 10, 2015  (KR) .................... 10-2015-0020062
Jan. 27, 2016  (KR) .................... 10-2016-0009789

(51) Int. Cl.
*B60H 1/00*     (2006.01)
(52) U.S. Cl.
CPC ..... *B60H 1/00864* (2013.01); *B60H 1/00064* (2013.01); *B60H 1/00964* (2013.01); *B60H 2001/002* (2013.01); *B60H 2001/00192* (2013.01)
(58) Field of Classification Search
CPC ............ B60H 1/00864; B60H 1/00064; B60H 1/00964; B60H 2001/00192; B60H 2001/002

USPC ........................................................... 454/75
See application file for complete search history.

(56) References Cited

U.S. PATENT DOCUMENTS

| 4,759,269 A * | 7/1988 | Brown | B60H 1/00842 165/217 |
| 4,800,951 A * | 1/1989 | Sakurai | B60H 1/00828 165/203 |
| 2012/0252341 A1* | 10/2012 | Maehata | B60H 1/00028 454/75 |

FOREIGN PATENT DOCUMENTS

| JP | H10193948 A | 7/1998 |
| KR | 20100028681 A | 3/2010 |
| KR | 20100086547 A | 8/2010 |

(Continued)

OTHER PUBLICATIONS

International Search Report issued in PCT/KR2016/000901 dated Apr. 8, 2016.

*Primary Examiner* — Steven B McAllister
*Assistant Examiner* — Allen R Schult
(74) *Attorney, Agent, or Firm* — Norton Rose Fulbright US LLP; James Crawford

(57) ABSTRACT

An air conditioning system for motor vehicles is designed to independently cool or heat a plurality of vehicle room regions and to independently adjust discharged air volume levels in the respective vehicle room regions. The air conditioning system includes a control unit configured to, when one of the discharged air volume levels in the respective vehicle room regions is set to a maximum air volume level, dependently control the other discharged air volume level to the maximum air volume level while entering into a maximum air volume control mode.

13 Claims, 5 Drawing Sheets

(56) References Cited

FOREIGN PATENT DOCUMENTS

KR      20110080291 A    7/2011
KR      20120113454 A    10/2012

* cited by examiner

[Fig. 1] Prior Art

Driver seat region    Front passenger seat region

[Fig. 2]

AIR CONDITIONING SYSTEM FOR MOTOR VEHICLES

This application is a § 371 of International Application No. PCT/KR2016/000901 filed Jan. 28, 2016, and claims priority from Korean Patent Application Nos. 10-2015-0020062 filed Feb. 10, 2015 and 10-2016-0009789 filed Jan. 27, 2016. The disclosures of the above patent applications are hereby incorporated herein by reference in their entirety.

TECHNICAL FIELD

The present invention relates to an air conditioning system for motor vehicles capable of independently and automatically controlling a plurality of regions in a vehicle room. More particularly, the present invention pertains to an air conditioning system for motor vehicles which is configured to control all the discharged air volume levels in the respective vehicle room regions to a maximum air volume level through only one switch operation and to cancel such control through only one switch operation and which is capable of alleviating a burden of repeatedly operating switches of the respective vehicle room regions one by one in order to control all the discharged air volume levels in the respective vehicle room regions to a maximum air volume level and to cancel such control and eventually improving the user convenience.

BACKGROUND ART

In recent years, an air conditioning system for independently cooling or heating a plurality of vehicle room regions has been developed. For example, there has been developed and used a dual-zone-type air conditioning system for independently cooling or heating a driver seat region and a front passenger seat region of a vehicle room.

In the dual-zone-type air conditioning system, as shown in FIG. 1, a driver seat side path 14 and a front passenger seat side path 16 are formed inside an air conditioner case 10. The air conditioning system individually controls the temperatures and volumes of the air supplied to a driver seat region and a front passenger seat region through the driver seat side path 14 and the front passenger seat side path 16. This makes it possible to independently cool or heat the driver seat region and the front passenger seat region.

The dual-zone-type air conditioning system further includes an air volume distribution door 20 installed on the upstream side of the driver seat side path 14 and the front passenger seat side path 16.

The air volume distribution door 20 is swung between the driver seat si de path 14 and the front passenger seat side path 16 to adjust the opening degrees of the driver seat side path 14 and the front passenger seat side path 16. Thus, the air volume distribution door 20 distributes the volume of the air introduced from a blower 30 into the driver seat side path 14 and the front passenger seat side path 16. This makes it possible to control the discharged air volume of the air supplied to the driver seat region and the front passenger seat region.

The dual-zone-type air conditioning system controls the air volume distribution door 20 and the blower 30 in association with each other, thereby adjusting a discharged air volume level in the driver seat region and a discharged air volume level in the front passenger seat region.

If the temperatures in the driver seat region and the front passenger seat region are individually set by a user or if the discharged air volume levels in the driver seat region and the front passenger seat region are manually set by a user, the air conditioning system intimately controls the opening position of the air volume distribution door 20 with respect to the driver seat side path 14 and the front passenger seat side path 16 and the rotational speed, of the blower 30 in conformity with the temperatures and the discharged air volume levels set by the user. This makes it possible to independently control the discharged air volume level in the driver seat region and the discharged air volume level in the front passenger seat region in conformity with the preset temperature or the preset discharged air volume level.

In this regard, the opening positions of the air volume distribution door 20 and the rotational speeds of the blower 30 are stored in advance as table values in association with the preset temperatures in the driver seat region and the front passenger seat region and the discharged air volume levels in the driver seat region and the front passenger seat region.

Accordingly, If the temperatures in the driver seat region and the front passenger seat region are individually set by a user or if the discharged air volume levels in the driver seat region and the front passenger seat region are manually set by a user, the opening position of the air volume distribution door 20 corresponding to the preset temperatures and the rotational speed of the blower 30 corresponding to the preset discharged air volume levels are detected from the table values.

The opening position of the air volume distribution door 20 and the rotational speed of the blower 30 are controlled according to the detected table value. Thus, the discharged air volume level in the driver seat region and the discharged air volume level in the front passenger seat region are independently controlled in conformity with the preset temperature or the preset discharged air volume level.

The conventional dual-zone-type air conditioning system is advantageous in that the driver seat region and the front passenger seat region can be independently cooled or heated by individually controlling the temperatures and volumes of the air supplied to the driver seat region and the front passenger seat region. However, the conventional dual-zone-type air conditioning system has a drawback in that the user convenience is insufficient.

For example, a user wishes to control both the discharged air volume level in the driver seat region and the discharged air volume level in the front passenger seat region to a maximum air volume level while independently cooling or heating the driver seat region and the front passenger seat region, it is necessary for the user to operate two air volume level switches one by one to set the maximum air volume level. Thus, it is onerous and inconvenient to use the air volume level switches.

As another example, when the vehicle room temperature is very high or low, there may be a case where a user controls the vehicle room temperature to a maximum cooling temperature or a maximum heating temperature. In this case, if the driver seat region and the front passenger seat region are cooled or heated independently, only the region for which the maximum cooling temperature or the maximum heating temperature is selected is controlled to the maximum air volume level. This may reduce the effect of cooling or heating the vehicle room at the maximum cooling temperature or the maximum heating temperature.

In order to make sure that the region for which the maximum cooling temperature or the maximum heating temperature is not selected is cooled or heated at the maximum air volume level, it is required to separately operate the corresponding switch. This may reduce the user convenience and may lead to user complaint.

SUMMARY OF THE INVENTION

In view of the aforementioned problems inherent in the related art, it is an object of the present invention to provide an air conditioning system for motor vehicles which is capable of controlling both a discharged air volume level in a driver seat region and a discharged air volume level in a front passenger seat region to a maximum air volume level through only one switch operation.

Another object of the present invention is to provide an air conditioning system for motor vehicles which is capable of improving the user convenience, by employing a configuration in which both a discharged air volume level in a driver seat region and a discharged air volume level in a front passenger seat region can be controlled to a maximum air volume level through only one switch operation.

A further object of the present invention is to provide an air conditioning system for motor vehicles which is capable of controlling both a discharged air volume level in a driver seat region and a discharged air volume level in a front passenger seat region to a maximum air volume level even when a maximum cooling/heating operation is selected with respect to only one of a driver seat region and a front passenger seat region.

A still further object of the present invention is to provide an air conditioning system for motor vehicles which is capable of achieving the maximum cooling/heating effect and eventually significantly improving the pleasantness in a vehicle room at the time of selecting a, maximum cooling/heating operation, by employing a configuration in which both a discharged air volume level in a driver seat region and a discharged air volume level in a front passenger seat region can be controlled to a maximum air volume level even when a maximum cooling/heating operation is selected with respect to only one of a driver seat region and a front passenger seat region.

In order to achieve the above objects, there is provided an air conditioning system for motor vehicles, which is designed to independently cool or heat a plurality of vehicle room regions and to independently adjust discharged air volume levels in the respective vehicle room regions, including: a control unit configured to, when one of the discharged air volume levels in the respective vehicle room regions is set to a maximum air volume level, dependently control the other discharged air volume level to the maximum air volume level while entering into a maximum air volume control mode.

In the air conditioning system, the control, unit may be configured to, when one of the discharged air volume levels in the respective vehicle room regions is reduced to a level lower than the maximum air volume level after entry into the maximum air volume control mode, dependently control the other discharged air volume level to a level lower than the maximum air volume level while being released from the maximum air volume control mode.

In the air conditioning system, the control unit is configured to, when released from the maximum air volume control mode, determine whether one of the discharged air volume levels in the respective vehicle room regions reduced to a level lower than the maximum air volume level has acted as a maximum air volume level entry leader of leading all the discharged air volume levels in the respective vehicle room regions to the maximum air volume level at the time of entry into the maximum air volume control mode, and differentially control the other dependently-controlled discharged air volume level depending on the determination result.

In the air conditioning system, when it is determined that one of the discharged air volume levels in the respective vehicle room regions reduced to a level lower than the maximum air volume level has acted as the maximum air volume level entry leader of leading all the discharged air volume levels in the respective vehicle room regions to the maximum air volume level at the time of entry into the maximum air volume control mode, the control unit may be configured to, when released from the maximum air volume control mode, control the discharged air volume level acted as the maximum air volume level entry leader according to a discharged air volume level value set by a user and cause the discharged air volume level dependently controlled to the maximum air volume level by the maximum air volume level entry leader to come back to an original discharged air volume level available before the entry into the maximum air volume control mode.

In the air conditioning system, when it is determined that one of the discharged air volume levels in the respective vehicle room regions reduced to a level lower than the maximum air volume level has not acted as the maximum air volume level entry leader of leading all the discharged air volume levels in the respective vehicle room regions to the maximum air volume level at the time of entry into the maximum air volume control mode, the control unit may be configured to, when released from the maximum air volume control mode, reduce the discharged air volume level acted as the maximum air volume level entry leader by one level from the maximum air volume level and control the discharged air volume level dependently controlled to the maximum air volume level by the maximum air volume level entry leader, according to the discharged air volume level value set by the user.

In the air conditioning system, the control unit may be configured to, when one of the discharged air volume levels in the respective vehicle room regions is controlled to the maximum air volume level by a user's manual operation, dependently control the other discharged air volume level to the maximum air volume level while entering into the maximum air volume control mode, and may be configured to, when one of the discharged air volume levels in the respective vehicle room regions is reduced to a level lower than the maximum air volume level by a user's manual operation after entry into the maximum air volume control mode, dependently reduce the other discharged air volume level to a level lower than the maximum air volume level while being released from the maximum air volume control mode.

In the air conditioning system, the control unit may be configured to, when one of the discharged air volume levels in the respective vehicle room regions is automatically controlled to the maximum air volume level, dependently control the other discharged air volume level to the maximum air volume level while entering into the maximum air volume control mode.

In the air conditioning system, the control unit may be configured to, when one of temperatures in the vehicle room regions is automatically controlled to a maximum cooling temperature or a maximum heating temperature, control both the discharged air volume level in the vehicle room region controlled to the maximum cooling temperature or the maximum heating temperature and the discharged air volume level in the other vehicle room region, to the maximum air volume level.

In the air conditioning system, the control unit may be configured to, when one of air conditioning modes in the respective vehicle room regions is selected as an auto mode after entry into the maximum air volume control mode, determine whether the air conditioning mode selected as the auto mode has acted as a maximum air volume level entry leader of leading all the discharged air volume levels in the respective vehicle room regions to the maximum air volume level at the time of entry into the maximum air volume control mode, and may be configured to determine whether to allow the air conditioning mode selected as the auto mode to enter into the auto mode depending on the determination result.

In the air conditioning system, the control unit may be configured to, when the air conditioning mode selected as the auto mode has acted as the maximum air volume level entry leader of leading all the discharged air volume levels in the respective vehicle room regions to the maximum air volume level, permit the air conditioning mode selected as the auto mode to enter into the auto mode while being released from the maximum air volume control mode, and may be configured to, when the air conditioning mode selected as the auto mode has not acted as the maximum air volume level entry leader, prevent the maximum air volume control mode from being released and prevent the air conditioning mode selected as the auto mode from entering into the auto mode.

According to the present air conditioning system for motor vehicles, if only one of the discharged air volume level in the driver seat region and the discharged air volume level in the front passenger seat region is set to the maximum air volume level, the other is automatically controlled to the maximum air volume level. Therefore, it is not necessary to operate individual switches one by one in order to set both the discharged air volume level in the driver seat region and the discharged air volume level in the front passenger seat region to the maximum air volume level. This makes it possible to improve the user convenience.

Even when the maximum cooling/heating operation is selected with respect to only one of the driver seat region and the front passenger seat region, it is possible to control both the discharged air volume level in the driver seat region and the discharged air volume level in the front passenger seat region to the maximum air volume level. This makes it possible to achieve the maximum cooling/heating effect and eventually significantly improve the pleasantness in the vehicle room at the time of selecting the maximum cooling/heating operation.

When one of the discharged air volume level in the driver seat region and the discharged air volume level in the front passenger seat region is set to an air volume level lower than the maximum air volume level while controlling the discharged air volume level in the driver seat region and the discharged air volume level in the front passenger seat region to the maximum air volume level, the other is automatically set to the air volume level lower than the maximum air volume level. Thus, the maximum air volume control mode can be cancelled through only one switch operation to establish a state in which the discharged air volume level in the driver seat region and the discharged air volume level in the front passenger seat region can be independently controlled. This makes it possible to improve the user convenience.

In the case where one of the discharged air volume level in the driver seat region and the discharged air volume level in the front passenger seat region is unintentionally and dependently set to the maximum air volume level at the time of entry into the maximum air volume control mode, it is possible to, when cancelling the maximum air volume control mode, restore the discharged air volume level set before the entry into the maximum air volume control mode. This makes it possible to restore the discharged air volume level set before the entry into the maximum air volume control mode, without having to re-operate the corresponding switch. Accordingly, it is possible to significantly improve the user convenience.

MODE FOR CARRYING OUT THE INVENTION

Preferred embodiments of an air conditioning system for motor vehicles according to the present invention will now be described in detail with reference to the accompanying drawings. Components similar to those of the related art described earlier will be designated by like reference symbols.

Figure 1:
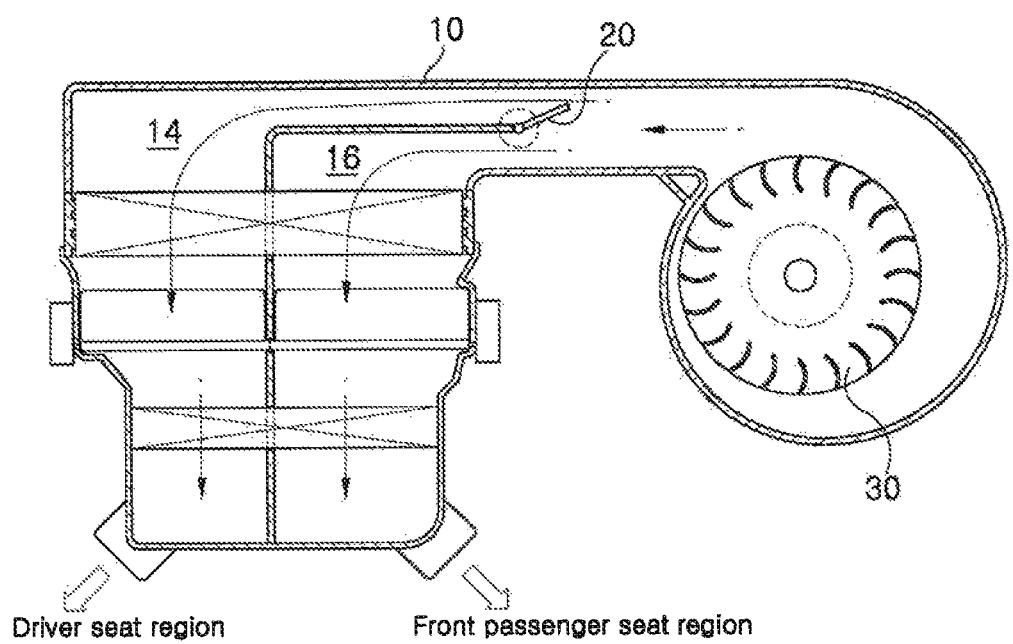
FIG. 1 is a view showing a conventional air conditioning system for motor vehicles.
Figure 2:
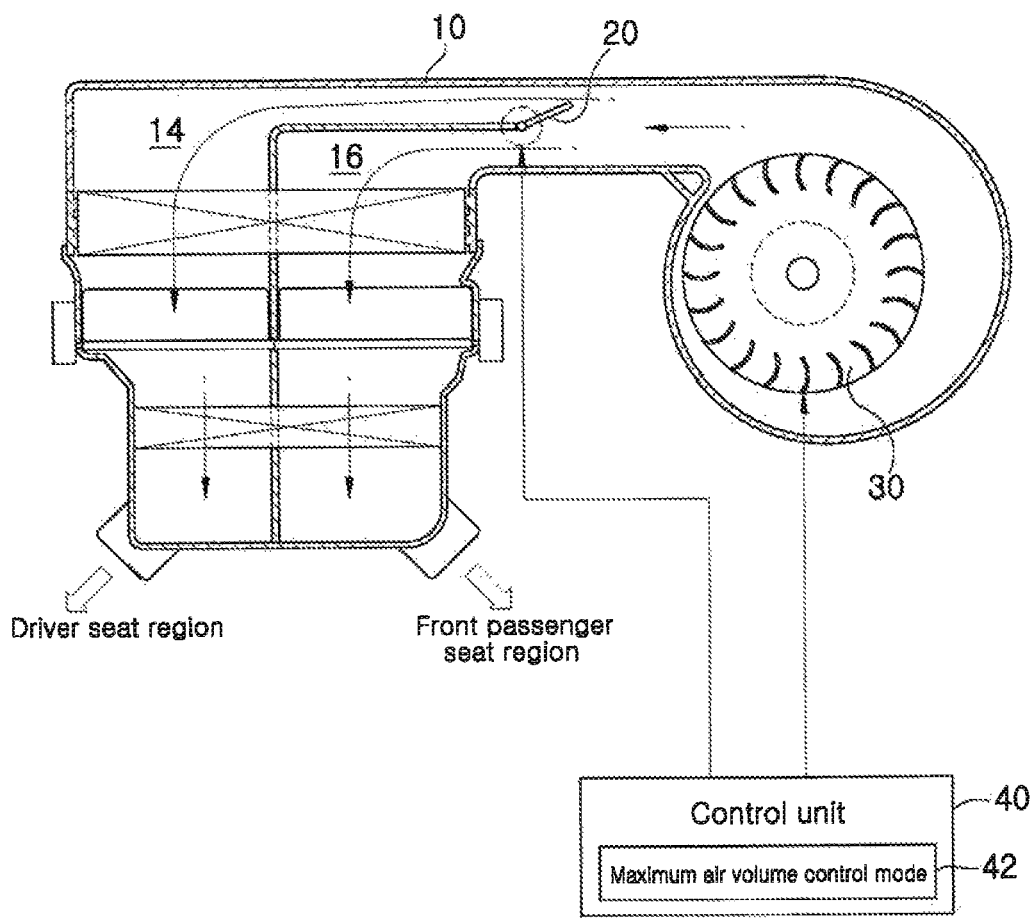
FIG. 2 is a view showing the configuration of an air conditioning system for motor vehicles according to the present invention.

Prior to describing features of an air conditioning system for motor vehicles according to the present invention, a dual-zone-type air conditioning system will be briefly described with reference to FIG. 2.

In the dual-zone-type air conditioning system, a driver seat side path 14 and a front passenger seat side path 16 are formed inside an air conditioner case 10. The air conditioning system independently controls the temperatures and volumes of the air supplied to a driver seat region and a front passenger seat region through the driver seat side path 14 and the front passenger seat side path 16.

The dual-zone-type air conditioning system further includes an air volume distribution door 20 installed on the upstream side of the driver seat side path 14 and the front passenger seat side path 16.

The air volume distribution door 20 is swung between the driver seat side path 14 and the front passenger seat side path 16 to adjust the opening degrees of the driver seat side path 14 and the front passenger seat side path 16. Thus, the air volume distribution door 20 distributes the volume of the air introduced from a blower 30 into the driver seat side path 14 and the front passenger seat side path 16. This makes it possible to control the discharged air volume of the air supplied to the driver seat region and the front passenger seat region.

The dual-zone-type air conditioning system controls the air volume distribution door 20 and the blower 30 in association with each other, thereby adjusting a discharged air volume level in the driver seat region and a discharged air volume level in the front passenger seat region.

If the temperatures in the driver seat region and the front passenger seat region are individually set by a user or if the discharged air volume levels in the driver seat region and the front passenger seat region are manually set by a user, the air conditioning system intimately controls the opening position of the air volume distribution door 20 with respect to the driver seat side path 14 and the front passenger seat side path 16 and the rotational speed of the blower 30 in conformity with the temperatures and the discharged air volume levels set by the user. This makes it possible to independently control the discharged air volume level in the driver seat region and the discharged air volume level in the front passenger seat region in conformity with the preset temperature or the preset discharged air volume level.

Next, features of the air conditioning system according to the present invention will be described in detail with reference to FIG. 2.

The present air conditioning system includes a control unit 40. The control unit 40 is provided with a microprocessor. The control unit 40 enters into a maximum air volume control mode 42 if a user sets one of a discharged air volume level in the driver seat region and a discharged air volume level in the front passenger seat region to a maximum air volume level.

The control unit 40, which has entered into the maximum air volume control mode 42, controls one of the discharged air volume levels selected by the user to the maximum air volume level and dependently controls the other discharged air volume level to the maximum air volume level.

For example, if the maximum air volume level is assumed to be an eighth level, when the user sets the discharged air volume level in the driver seat region to the eighth level, the control unit 40 enters into the maximum air volume control mode 42 and controls not only the discharged air volume level in the driver seat region but also the discharged air volume level in the front passenger seat region to the eighth level.

Accordingly, if one of the discharged air volume level in the driver seat region and the discharged air volume level in the front passenger seat region is set to the maximum air volume level, the control unit 40 controls both the discharged air volume level in the driver seat region and the discharged air volume level in the front passenger seat region to the maximum air volume level.

Thus, it is not necessary for the user to operate two discharged air volume level switches in order to set both the discharged air volume level in the driver seat region and the discharged air volume level in the front passenger seat region to the maximum air volume level. This makes it possible to improve the user convenience.

Even when the user sets one of a temperature in the driver seat region and a temperature in the front passenger seat region to a maximum cooling temperature or a maximum heating temperature (hereinafter, the maximum cooling temperature will be described by way of example), the control unit 40 enters into the maximum air volume control mode 42 to control the discharged air volume level in the region, for which the maximum cooling temperature is selected, to the maximum air volume level and to dependently control the discharged air volume level in the region, for which the maximum cooling temperature is not selected, to the maximum air volume level.

Accordingly, if one of the temperature in the driver seat region and the temperature in the front passenger seat region is set to the maximum cooling temperature, the control unit 40 controls both the discharged air volume level in the driver seat region and the discharged air volume level in the front passenger seat region to the maximum air volume level.

Thus, when the maximum cooling temperature is selected, it is possible to achieve the maximum cooling effect. As a result, it is possible to significantly improve the pleasantness in the vehicle room.

Even when one of the temperature in the driver seat region and the temperature in the front passenger seat region is automatically set to the maximum cooling temperature, the control unit 40 enters into the maximum air volume control mode 42 to control the discharged air volume level in the region, for which the maximum cooling temperature is selected, to the maximum air volume level and to dependently control the discharged air volume level in the region, for which the maximum cooling temperature is not selected, to the maximum air volume level.

Referring again to FIG. 2, if one of the discharged air volume level in the driver seat region and the discharged air volume level in the front passenger seat region is set to a level lower than the maximum air volume level by a user's manual operation while both the discharged air volume level in the driver seat region and the discharged air volume level in the front passenger seat region are controlled to the maximum air volume level, the control unit 40 is released from the maximum air volume control mode 42.

The control unit 40 released from the maximum air volume control mode 42 controls the air volume distribution door 20 and the blower 30 to reduce the discharged air volume level in the manually-controlled region to a level lower than the maximum air volume level and to reduce the discharged air volume level in the non-manually-controlled region to a level lower than the maximum air volume level.

Accordingly, if the selected one of the discharged air volume level in the driver seat region and the discharged air volume level in the front passenger seat region is reduced to a level lower than the maximum air volume level, the control unit 40 reduces both the discharged air volume level in the driver seat region and the discharged air volume level in the front passenger seat region to a level lower than the maximum air volume level.

Thus, it is possible to cancel the maximum air volume control mode 42 through only one switch operation and to control both the discharged air volume level in the driver seat region and the discharged air volume level in the front passenger seat region to a level lower than the maximum air volume level.

As a result, the maximum air volume control mode 42 can be cancelled through only one switch operation, thereby establishing a state in which the discharged air volume level in the driver seat region and the discharged air volume level in the front passenger seat region can be controlled independently.

Referring again to FIG. 2, when the selected one of the discharged air volume level in the driver seat region and the discharged air volume level in the front passenger seat region is reduced to a level lower than the maximum air volume level by a user's manual operation, the control unit 40 reduces both the discharged air volume level in the driver seat region and the discharged air volume level in the front passenger seat region to a level lower than the maximum air volume level and determines whether one of the discharged air volume level in the driver seat region and the discharged air volume level in the front passenger seat region reduced to a level lower than the maximum air volume level through a user's selection has acted as a maximum air volume level entry leader of leading both the discharged air volume level in the driver seat region and the discharged air volume level in the front passenger seat region to the maximum air volume level at the time of entry into the maximum air volume control mode 42.

If it is determined that one of the discharged air volume level in the driver seat region and the discharged air volume level in the front passenger seat region reduced to a level lower than the maximum air volume level through a user's selection has acted as the maximum air volume level entry leader of leading both the discharged air volume level in the driver seat region and the discharged air volume level in the front passenger seat region to the maximum air volume level, the control unit 40 is configured to, when cancelling the maximum air volume control mode 42, control the discharged air volume level acted as the maximum air volume level entry leader so as to become equal to the discharged air volume level selected by the user and causes the discharged air volume level unintentionally controlled to the maximum air volume level by the maximum air volume level entry leader to come back to an original discharged air volume level available before the entry into the maximum air volume control mode 42.

Thus, when cancelling the maximum air volume control mode 42, the discharged air volume level unintentionally controlled to the maximum air volume level can be returned to an original discharged air volume level available before the entry into the maximum air volume control mode 42 through only one switch operation.

Accordingly, it is not necessary for the user to, when cancelling the maximum air volume control mode 42, repeatedly push and operate the corresponding discharged air volume level switch in order to restore an original discharged air volume level available before the entry into the maximum air volume control mode 42. This makes it possible to significantly improve the user convenience.

Referring again to FIG. 2, when the selected one of the discharged air volume level in the driver seat region and the discharged air volume level in the front passenger seat region is reduced to a level lower than the maximum air volume level by a user's manual operation, the control unit 40 reduces both the discharged air volume level in the driver seat region and the discharged air volume level in the front passenger seat region to a level lower than the maximum air volume level. In this case, it may be determined that one of the discharged air volume level in the driver seat region and the discharged air volume level in the front passenger seat region reduced to a level lower than the maximum air volume level through a user's selection has not acted as the maximum air volume level entry leader of leading both the discharged air volume level in the driver seat region and the discharged air volume level in the front passenger seat region to the maximum air volume level.

If it is determined that one of the discharged air volume level in the driver seat region and the discharged air volume level in the front passenger seat region reduced to a level lower than the maximum air volume level through a user's selection has not acted as the maximum air volume level entry leader of leading both the discharged air volume level in the driver seat region and the discharged air volume level in the front passenger seat region to the maximum air volume level, the control unit 40 is configured to reduce the discharged air volume level acted as the maximum air volume level entry leader by one level from the maximum air volume level and controls the discharged air volume level unintentionally controlled to the maximum air volume level by the maximum air volume level entry leader so as to become equal to the discharged air volume level selected by the user.

Referring again to FIG. 2, when both the discharged air volume level in the driver seat region and the discharged air volume level in the front passenger seat region are controlled to the maximum air volume level, one of an air conditioning mode in the driver seat region and an air conditioning mode in the front passenger seat region may be selected as an auto mode by the user.

When one of the air conditioning mode in the driver seat region and the air conditioning mode in the front passenger seat region is selected as the auto mode by the user, the control unit 40 determines whether the auto mode selected by the user has acted as a maximum air volume level entry leader of leading both the discharged air volume level in the driver seat region and the discharged air volume level in the front passenger seat region to the maximum air volume level at the time of entry into the maximum air volume control mode 42. The control unit 40 determines whether to cancel the maximum air volume control mode 42 depending on the determination result.

More specifically, if it is determined that the auto mode selected by the user from the air conditioning mode in the driver seat region and the air conditioning mode in the front passenger seat region has acted as a maximum air volume level entry leader of leading both the discharged air volume level in the driver seat region and the discharged air volume level in the front passenger seat region to the maximum air volume level, the control unit 40 is released from the maximum air volume control mode 42.

The control unit 40 released from the maximum air volume control mode 42 controls the air volume distribution door 20 and the blower 30, thereby controlling the discharged air volume level in the driver seat region and the discharged air volume level in the front passenger seat region.

At this time, as shown in Table 1 below, the discharged air volume level acted as the maximum air volume level entry leader is automatically controlled under the auto mode selected by the user. On the other hand, the discharged air volume level unintentionally and dependently controlled to the maximum air volume level by the maximum air volume level entry leader comes back to the state available before entry into the maximum air volume control mode 42.

When the dependently-controlled discharged air volume level has been manually controlled before entry into the maximum air volume control mode 42, the discharged air volume level unintentionally and dependently controlled to the maximum air volume level comes back to an original manual control value. When the dependently-controlled discharged air volume level has been automatically controlled before entry into the maximum air volume control mode 42, the discharged air volume level unintentionally and dependently controlled to the maximum air volume level comes back to an original automatic control value.

TABLE 1

Control of the discharged air volume level in the driver seat region and the discharged air volume level in the front passenger seat region at the time of selection of the auto mode

| | Classification | | |
|---|---|---|---|
| Auto Mode Selected | Discharged air volume level on the leader side | | Discharged air volume level on the follower side |
| Maximum air volume level entry leader | Automatic control | | Manual    Manual control<br>Automatic    Automatic control |
| Maximum air volume level entry follower | Maximum air volume level | Unable to cancel maximum air volume level (Auto mode not available) | Unable to cancel maximum air volume level (Auto mode not available)<br>Auto mode switch indicator turned on |
| | Lower than maximum air volume level | Manual or automatic control | Automatic control |

Meanwhile, it may be determined that the auto mode selected by the user from the air conditioning mode in the driver seat region and the air conditioning mode in the front passenger seat region has not acted as the maximum air volume level entry leader of leading both the discharged air volume level in the driver seat region and the discharged air volume level in the front passenger seat region to the maximum air volume level but has acted as a maximum air volume level entry follower.

In this case, the control unit 40 cannot be released from the maximum air volume control mode 42 as long as the discharged air volume level acted as the maximum air volume level entry leader continues to remain at the maximum air volume level. As a result, the discharged air volume level in the driver seat region and the discharged air volume level in the front passenger seat region cannot be cancelled from the maximum air volume level. Furthermore, the air conditioning mode cannot be selected as the auto mode.

However, when the discharged air volume level acted as the maximum air volume level entry leader is manually controlled to a level lower than the maximum air volume level by the user or automatically controlled to a level lower than the maximum air volume level by the selection of the auto mode in a state in which the air conditioning mode in the dependently-controlled region is selected as the auto mode, the control unit 40 is released from the maximum air volume control mode 42 even if the air conditioning mode selected as the auto mode by the user is a dependently-controlled air conditioning mode.

At this time, the control unit 40 released from the maximum air volume control mode 42 controls the air volume distribution door 20 and the blower 30, thereby controlling the discharged air volume level in the driver seat region and the discharged air volume level in the front passenger seat region.

In particular, as shown in Table 1 above, the discharged air volume level acted as the maximum air volume level entry leader is manually or automatically controlled in the manual mode or the auto mode selected by the user.

The discharged air volume level in the region dependently controlled to the maximum air volume level is automatically controlled in the auto mode selected by the user.

When the air conditioning mode in the region dependently controlled to the maximum air volume level is selected as the auto mode by the user in a state in which the discharged air volume level acted as the maximum air volume level entry leader is maintained at the maximum air volume level, the control unit 40 prevents entry into the auto mode.

In this case, an indicator (not shown) of an auto mode switch (not shown) corresponding to the dependently-controlled region whose air conditioning mode is selected as the auto mode is turned on.

With this configuration, when the discharged air volume level acted as the maximum air volume level entry leader is manually or automatically controlled to a level lower than the maximum air volume level, the control unit 40 is immediately released from the maximum air volume control mode 42 and the air conditioning system is controlled in the auto mode selected by the user.

Figure 3:
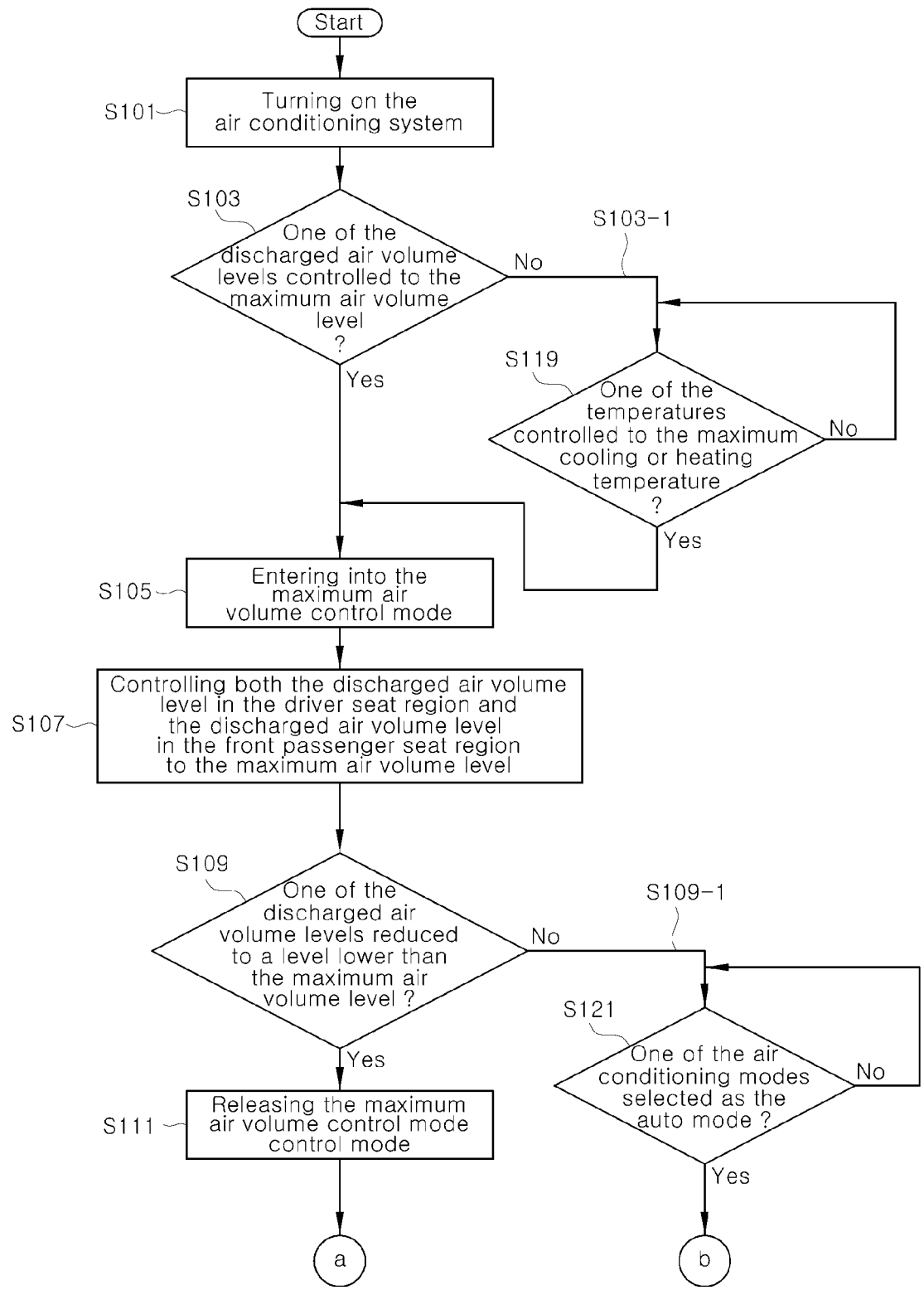
FIGS. 3, 4, and 5 are flowcharts showing an operation example of the air conditioning system for motor vehicles according to the present invention.

Next, an operation example of through air conditioning system having such a configuration will be described with reference to FIGS. 3 to 5.

First, the air conditioning system is turned on (S101). In this state, it is determined whether one of the discharged air volume level in the driver seat region and the discharged air volume level in the front passenger seat region is controlled to the maximum air volume level by a user's manual operation (S103).

For example, when the maximum air volume level is an eighth level, it is determined whether one of the discharged air volume level in the driver seat region and the discharged air volume level in the front passenger seat region is controlled to the eighth level by a user's manual operation.

If it is determined that one of the discharged air volume level in the driver seat region and the discharged air volume level in the front passenger seat region is controlled to the maximum air volume level (eighth level) by a user's manual operation, the control unit 40 enters into the maximum air volume control mode 42 (S105).

The control unit 40 entered into the maximum air volume control mode 42 controls both the discharged air volume level in the driver seat region and the discharged air volume level in the front passenger seat region to the maximum air volume level (eighth level)(S107).

Furthermore, while controlling both the discharged air volume level in the driver seat region and the discharged air volume level in the front passenger seat region to the maximum air volume level, the control unit 40 determines whether one of the discharged air volume level in the driver seat region and the discharged air volume level in the front passenger seat region is reduced to a level lower than the maximum air volume level by a user's manual operation (S109).

For example, the control unit 40 determines whether one of the discharged air volume level in the driver seat region and the discharged air volume level in the front passenger seat region is reduced from the maximum air volume level (eighth level) to a seventh level.

If it is determined that one of the discharged air volume level in the driver seat region and the discharged air volume level in the front passenger seat region is reduced from the maximum air volume level (eighth level) to a seventh level, the control unit 40 is released from the maximum air volume control mode 42 (S111).

Figure 4:
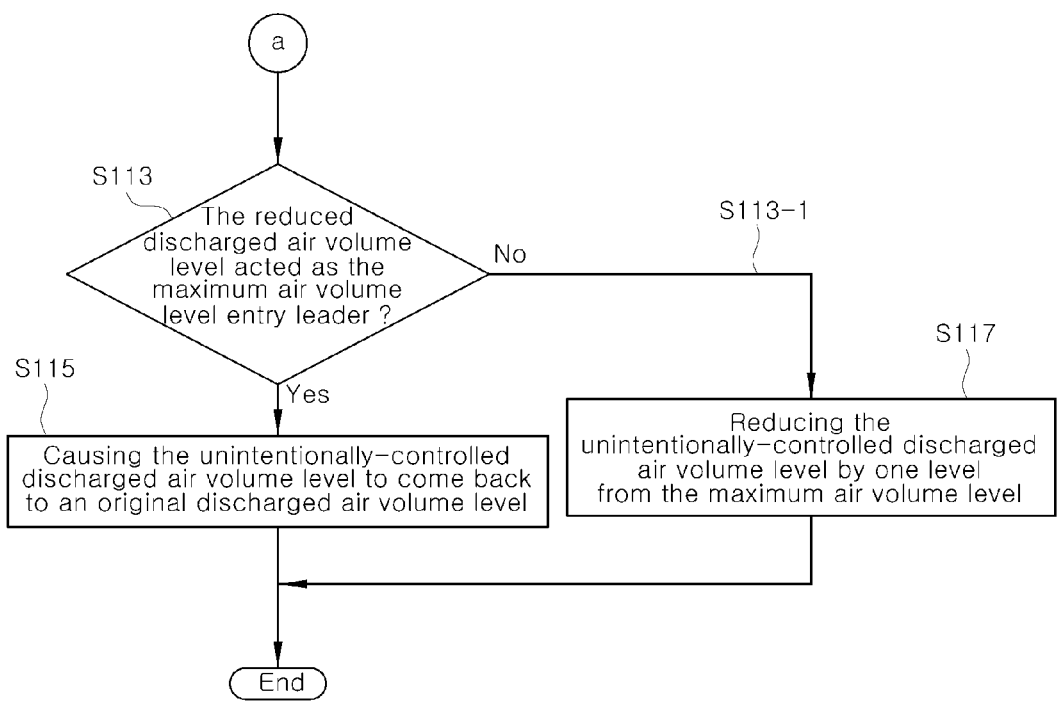
Figure 5:
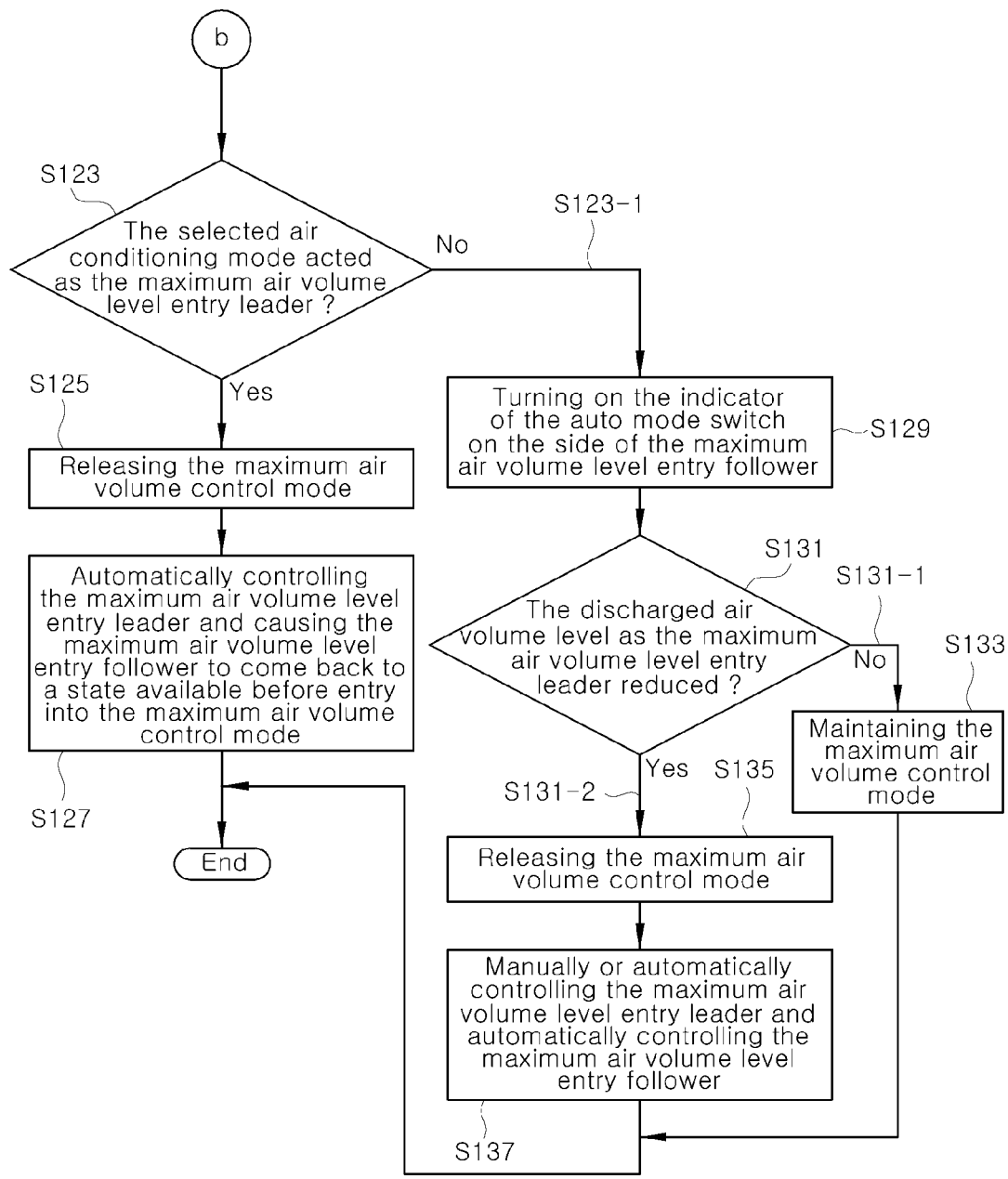

Then, as shown in FIG. 4, the control unit 40 determines whether one of the discharged air volume level in the driver seat region and the discharged air volume level in the front passenger seat region reduced from the maximum air volume level (eighth level) to a seventh level has acted as a maximum air volume level entry leader of leading both the discharged air volume level in the driver seat region and the discharged air volume level in the front passenger seat region to the maximum air volume level (eighth level) at the time of entry into the maximum air volume control mode 42 (S113).

For example, when both the discharged air volume level in the driver seat region and the discharged air volume level in the front passenger seat region are controlled to the maximum air volume level (eighth level) as the discharged air volume level in the driver seat region is set to the maximum air volume level (eighth level), the control unit 40 determines whether one of the discharged air volume level in the driver seat region and the discharged air volume level in the front passenger seat region reduced from the maximum air volume level (eighth level) to a seventh level is the discharged air volume level in the driver seat region which acts as the maximum air volume level (eighth level) entry leader.

If it is determined that one of the discharged air volume level in the driver seat region and the discharged air volume level in the front passenger seat region reduced from the maximum air volume level (eighth level) to a seventh level is the maximum air volume level (eighth level) entry leader, namely the discharged air volume level in the driver seat region, the control unit 40 causes the discharged air volume level in the front passenger seat region unintentionally controlled to the maximum air volume level according to the discharged air volume level in the driver seat region to come back to an original discharged air volume level available before the entry into the maximum air volume control mode 42 (S115).

For example, if the discharged air volume level in the front passenger seat region available before the entry into the maximum, air volume control mode 42 is a fourth level, the control unit 40 causes the discharged air volume level in the front passenger seat region to come back to the original fourth level.

Thus, the discharged air volume level in the front passenger seat region unintentionally controlled to the maximum air volume level can be caused to come back to the discharged air volume level available before the entry into the maximum air volume control mode 42 through only one switch operation. This makes it possible to improve the user convenience.

If it is determined in step S113 that one of the discharged air volume level in the driver seat region and the discharged air volume level in the front passenger seat region reduced from the maximum air volume level (eighth level) to a seventh level is not the maximum air volume level (eighth level) entry leader, namely the discharged air volume level in the driver seat region (S113-1), the control unit 40 reduces the discharged air volume level in the front passenger seat region unintentionally controlled to the maximum air volume level according to the discharged air volume level in the driver seat region, by one level from the maximum air volume level (eighth level) (S117).

Then, the discharged air volume level in the front passenger seat region unintentionally controlled to the maximum air volume level is reduced from the maximum air volume level (eighth level) to a seventh level. Thus, it is possible to independently control the discharged air volume level in the front passenger seat region while reducing the discharged air volume.

Referring again to FIG. 3, if it is determined in step S103 that one of the discharged air volume level in the driver seat region and the discharged air volume level in the front passenger seat region is not controlled to the maximum air volume level (eighth level) (S103-1), namely if it is determined in step S103 that both the discharged air volume level in the driver seat region and the discharged air volume level in the front passenger seat region are not controlled to the maximum air volume level (eighth level), the control unit 40 determines whether one of the temperature in the driver seat region and the temperature in the front passenger seat region is manually or automatically controlled to a maximum cooling temperature or a maximum heating temperature (S119).

If it is determined that one of the temperature in the driver seat region and the temperature in the front passenger seat region is controlled to the maximum cooling temperature or the maximum heating temperature, the control unit 40 enters into the maximum air volume control mode 42 (S105).

Then, the control unit 40 entered into the maximum air volume control mode 42 controls the discharged air volume level in the driver seat region and the discharged air volume level in the front passenger seat region through steps S107, S109, S111, S113, S115 and S117.

Referring again to FIGS. 3 and 5, if it is determined in step S109 that none of the discharged air volume level in the driver seat region and the discharged air volume level in the front passenger seat region is reduced to a level lower than the maximum air volume level by a user's manual operation (S109-1), the control unit 40 determines whether one of the air conditioning mode in the driver seat region and the air conditioning mode in the front passenger seat region is selected as an auto mode by the user (S121).

If it is determined that one of the air conditioning mode in the driver seat region and the air conditioning mode in the front passenger seat region is selected as the auto mode, the control unit 40 determines whether one of the air conditioning mode in the driver seat region and the air conditioning mode in the front passenger seat region selected as the auto mode has acted as a maximum air volume level entry leader of leading both the discharged air volume level in the driver seat region and the discharged air volume level in the front passenger seat region to the maximum air volume level at the time of entry into the maximum air volume control mode 42 (S123).

For example, when the discharged air volume level has acted as the maximum air volume level (eighth level) entry leader as the discharged air volume level in the driver seat region is set to the maximum air volume level (eighth level), the control unit 40 determines whether one of the air conditioning mode in the driver seat region and the air conditioning mode in the front passenger seat region selected as the auto mode is the air conditioning mode in the driver seat region which acts as the maximum air volume level (eighth level) entry leader.

If it is determined that one of the air conditioning mode in the driver seat region and the air conditioning mode in the front passenger seat region selected as the auto mode is the maximum air volume level (eighth level) entry leader, namely the air conditioning mode in the driver seat region, the control unit 40 is released from the maximum air volume control mode 42 (S125).

The control unit 40 released from the maximum air volume control mode 42 automatically controls the discharged air volume level acted as the maximum air volume level entry leader according to the auto mode selected by the user and causes the discharged air volume level in the dependently-controlled region to come back to the state available before entry into the maximum air volume control mode 42 (S127).

In the case where the discharged air volume level in the dependently-controlled region has been manually controlled before entry into the maximum air volume control mode 42, the control unit 40 causes the discharged air volume level in the dependently-controlled region to come back to an original manual control value. In the case where the discharged air volume level in the dependently-controlled region has been automatically controlled before entry into the maximum air volume control mode 42, the control unit 40 causes the discharged air volume level in the dependently-controlled region to come back to an original automatic control value.

If it is determined in step S123 that one of the air conditioning mode in the driver seat region and the air conditioning mode in the front passenger seat region selected as the auto mode is not the maximum air volume level (eighth level) entry leader, namely the air conditioning mode in the driver seat region (S123-1), the control unit 40 determines that one of the air conditioning mode in the driver seat region and the air conditioning mode in the front passenger seat region selected as the auto mode is the maximum air volume level (eighth level) entry follower, namely the air conditioning mode in the front passenger seat region. According to this determination, the control unit 40 is configured to turn on the indicator of the auto mode switch corresponding to the front passenger seat region (S129).

In this state, the control unit 40 determines whether the discharged air volume level on the side of the maximum air volume level (eighth level) entry leader, namely the discharged air volume level in the driver seat region, is automatically or manually reduced to a level lower than the maximum air volume level (eighth level) (S131).

If it is determined that the discharged air volume level in the driver seat region is not reduced to a level lower than the maximum air volume level (eighth level) (S131-1), the control unit 40 maintains the maximum air volume control mode 42 (3133). Thus, the control unit 40 continues to control the discharged air volume level in the driver seat region and the discharged air volume level in the front passenger seat region to the maximum air volume level (eighth level).

On the other hand, if it is determined that the discharged air volume level in the driver seat region is reduced to a level lower than the maximum air volume level (eighth level) (S131-2), the control unit 40 is released from the maximum air volume control mode 42 (S135).

The control unit 40 released from the maximum air volume control mode 42 manually or automatically controls the discharged air volume level acted as the maximum air volume level entry leader and automatically controls the discharged air volume level in the dependently-controlled region according to the auto mode selected by the user (S137).

According to the present air conditioning system configured as described above, if only one of the discharged air volume level in the driver seat region and the discharged air volume level in the front passenger seat region is set to the maximum air volume level, the other is automatically controlled to the maximum air volume level. Therefore, it is not necessary to operate individual switches one by one in order to set both the discharged air volume level in the driver seat region and the discharged air volume level in the front passenger seat region to the maximum air volume level. This makes it possible to improve the user convenience.

Even when the maximum cooling/heating operation is selected with respect to only one of the driver seat region and the front passenger seat region, it is possible to control both the discharged air volume level in the driver seat region and the discharged air volume level in the front passenger seat region to the maximum air volume level. This makes it possible to achieve the maximum cooling/heating effect and eventually significantly improve the pleasantness in the vehicle room at the time of selecting the maximum cooling/heating operation.

When one of the discharged air volume level in the driver seat region and the discharged air volume level in the front passenger seat region is set to an air volume level lower than the maximum air volume level while controlling the discharged air volume level in the driver seat region and the discharged air volume level in the front passenger seat region to the maximum air volume level, the other is automatically set to the air volume level lower than the maximum air volume level. Thus, the maximum air volume control mode 42 can be cancelled through only one switch operation to establish a state in which the discharged air volume level in the driver seat region and the discharged air volume level in the front passenger seat region can be independently controlled. This makes it possible to improve the user convenience.

In the case where one of the discharged air volume level in the driver seat region and the discharged air volume level in the front passenger seat region is unintentionally and dependently set to the maximum air volume level at the time of entry into the maximum air volume control mode 42, it is possible to, when cancelling the maximum air volume control mode 42, restore the discharged air volume level set before the entry into the maximum air volume control mode 42. This makes it possible to restore the discharged air volume level set before the entry into the maximum air volume control mode 42, without having to re-operate the corresponding switch. Accordingly, it is possible to significantly improve the user convenience.

While some preferred embodiments of the present invention have been described above, the present invention is not limited to these embodiments. It is to be understood that various changes and modifications may be made without departing from the scope of the invention defined in the claims.

For example, in the present embodiment, there has been described an example in which the discharged air volume level in the driver seat region and the discharged air volume level in the front passenger seat region are controlled through a user's manual operation. However, the present invention may be applied to a case where the discharged air volume level in the driver seat region and the discharged air volume level in the front passenger seat region are automatically controlled.

Specifically, even when automatically controlling the discharged air volume level in the driver seat region and the discharged air volume level in the front passenger seat region, if one of the discharged air volume level in the driver seat region and the discharged air volume level in the front passenger seat region is controlled to the maximum air volume level, the other may be dependently controlled to the maximum air volume level while entering into the maximum air volume control mode 42.

In the present embodiment, there has been described an example where the vehicle room is divided into two zones, namely the driver seat region and the front passenger seat region. However, the present invention is not limited thereto. The present invention may be applied to a case where the vehicle room is divided into three zones, namely the driver seat region, the front passenger seat region and the rear seat region, or four zones, namely the driver seat region, the front passenger seat region, the rear left seat region and the rear right seat region.

DESCRIPTION OF REFERENCE NUMERALS

10: air conditioner case
14: driver seat side path
16: front passenger seat side path
20: air volume distribution door
30: blower
40: control unit
42: maximum air volume control mode

What is claimed is:

1. An air conditioning system for motor vehicles, which is designed to independently cool or heat a plurality of vehicle room regions comprising a driver seat region and a front passenger seat region and to independently adjust discharged air volume levels in the respective vehicle room regions, comprising:
a control unit configured to, when one of the discharged air volume levels in one of the driver seat region or the front passenger seat region is set to a maximum air volume level, dependently control the other discharged air volume level in the other of the driver seat region or the front passenger seat region for which the maximum air volume level is not selected to the maximum air volume level while entering into a maximum air volume control mode;

and an air volume distribution door installed on the upstream side of the driver seat side path and the front passenger seat side path;

and wherein the driver seat side path and the front passenger seat side path are formed inside an air conditioner case and the air conditioning system independently controls the temperatures and volumes of the air supplied to a driver seat region and a front passenger seat region through the driver seat side path and the front passenger seat side path, and wherein the air volume distribution door is swung between the driver seat side path and the front passenger seat side path to adjust the opening degrees of the driver seat side path and the front passenger seat side path in order to distribute the volume of the air introduced from a blower into the driver seat side path and the front passenger seat side path, and wherein the control unit is configured to, when one of the discharged air volume levels in the respective vehicle room regions is reduced to a level lower than the maximum air volume level after entry into the maximum air volume control mode, dependently control the other discharged air volume level to a level lower than the maximum air volume level while being released from the maximum air volume control mode, and wherein the control unit is configured to, when released from the maximum air volume control mode, determine whether one of the discharged air volume levels in the respective vehicle room regions reduced to a level lower than the maximum air volume level has acted as a maximum air volume level entry leader of leading all the discharged air volume levels in the respective vehicle room regions to the maximum air volume level at the time of entry into the maximum air volume control mode, and differentially control the other dependently-controlled discharged air volume level depending on a determination result.

2. The air conditioning system of claim 1, wherein when the control unit determines that one of the discharged air volume levels in the respective vehicle room regions reduced to a level lower than the maximum air volume level has acted as the maximum air volume level entry leader of leading all the discharged air volume levels in the respective vehicle room regions to the maximum air volume level at the time of entry into the maximum air volume control mode, the control unit is configured to, when released from the maximum air volume control mode, control the discharged air volume level acted as the maximum air volume level entry leader according to a discharged air volume level value set by a user and cause the discharged air volume level dependently controlled to the maximum air volume level by the maximum air volume level entry leader to come back to an original discharged air volume level available before the entry into the maximum air volume control mode.

3. The air conditioning system of claim 2, wherein when the control unit determines that one of the discharged air volume levels in the respective vehicle room regions reduced to a level lower than the maximum air volume level has not acted as the maximum air volume level entry leader of leading all the discharged air volume levels in the respective vehicle room regions to the maximum air volume level at the time of entry into the maximum air volume control mode, the control unit is configured to, when released from the maximum air volume control mode, reduce the discharged air volume level acted as the maximum air volume level entry leader by one level from the maximum air volume level and control the discharged air volume level dependently controlled to the maximum air volume level by the maximum air volume level entry leader, according to the discharged air volume level value set by the user.

4. The air conditioning system of claim 3, wherein the control unit is configured to, when one of the discharged air volume levels in the respective vehicle room regions is controlled to the maximum air volume level by the user's manual operation, dependently control the other discharged air volume level to the maximum air volume level while entering into the maximum air volume control mode, and is configured to, when one of the discharged air volume levels in the respective vehicle room regions is reduced to a level lower than the maximum air volume level by a user's manual operation after entry into the maximum air volume control mode, dependently reduce the other discharged air volume level to a level lower than the maximum air volume level while being released from the maximum air volume control mode.

5. The air conditioning system of claim 4, wherein the control unit is configured to, when one of the discharged air volume levels in the respective vehicle room regions is automatically controlled to the maximum air volume level, dependently control the other discharged air volume level to the maximum air volume level while entering into the maximum air volume control mode.

6. The air conditioning system of claim 1, wherein the control unit is configured to, when one of temperatures in the vehicle room regions is automatically controlled to a maximum cooling temperature or a maximum heating temperature, control both the discharged air volume level in the vehicle room region controlled to the maximum cooling temperature or the maximum heating temperature and the discharged air volume level in the other vehicle room region, to the maximum air volume level.

7. The air conditioning system of claim 5, wherein the control unit is configured to, when one of air conditioning modes in the respective vehicle room regions is selected as an auto mode after entry into the maximum air volume control mode, determine whether the air conditioning mode selected as the auto mode has acted as a maximum air volume level entry leader of leading all the discharged air volume levels in the respective vehicle room regions to the maximum air volume level at the time of entry into the maximum air volume control mode, and is configured to determine whether to allow the air conditioning mode selected as the auto mode to enter into the auto mode depending on the determination result.

8. The air conditioning system of claim 7, wherein the control unit is configured to, when the air conditioning mode selected as the auto mode has acted as the maximum air volume level entry leader of leading all the discharged air volume levels in the respective vehicle room regions to the maximum air volume level, permit the air conditioning mode selected as the auto mode to enter into the auto mode while being released from the maximum air volume control mode, and is configured to, when the air conditioning mode selected as the auto mode has not acted as the maximum air volume level entry leader, prevent the maximum air volume control mode from being released and prevent the air conditioning mode selected as the auto mode from entering into the auto mode.

9. The air conditioning system of claim 8, wherein the control unit is configured to, when the air conditioning mode selected as the auto mode has acted as the maximum air volume level entry leader, automatically control the discharged air volume level acted as the maximum air volume level entry leader according to the selected auto mode while being released from the maximum air volume control mode and cause the discharged air volume level dependently controlled to the maximum air volume level by the maximum air volume level entry leader to come back to a state available before the entry into the maximum air volume control mode.

10. The air conditioning system of claim 9, wherein when the discharged air volume level dependently controlled to the maximum air volume level by the maximum air volume level entry leader is caused to come back to a state available before the entry into the maximum air volume control mode, the control unit is configured to allow the dependently-controlled discharged air volume level to come back to an original manual control value, if the dependently-controlled discharged air volume level is manually controlled before the entry into the maximum air volume control mode, and is configured to allow the dependently-controlled discharged air volume level to come back to an original automatic control value, if the dependently-controlled discharged air volume level is automatically controlled before the entry into the maximum air volume control mode.

11. The air conditioning system of claim 10, wherein when the air conditioning mode selected as the auto mode has not acted as the maximum air volume level entry leader of leading the discharged air volume levels in the respective vehicle room regions to the maximum air volume level, the control unit is configured to turn on an indicator of an auto mode switch corresponding to the air conditioning mode selected as the auto mode, even if the air conditioning mode selected as the auto mode is prevented from entering into the auto mode.

12. The air conditioning system of claim 11, wherein even when the air conditioning mode selected as the auto mode has not acted as the maximum air volume level entry leader of leading the discharged air volume levels in the respective vehicle room regions to the maximum air volume level, the control unit is configured to allow the maximum air volume control mode to be released and allow the air conditioning mode selected as the auto mode to enter into the auto mode, as long as the discharged air volume level acted as the maximum air volume level entry leader is manually reduced to a level lower than the maximum air volume level or automatically reduced to a level lower than the maximum air volume level by a user's selection of the auto mode.

13. The air conditioning system of claim 12, wherein when the discharged air volume level acted as the maximum air volume level entry leader is manually or automatically controlled to a level lower than the maximum air volume level in a state in which the air conditioning mode not acted as the maximum air volume level entry leader is selected as the auto mode, the control unit is configured to manually or automatically control the discharged air volume level acted as the maximum air volume level entry leader according to manual mode or an auto mode selected by a user while being released from the maximum air volume control mode and is configured to automatically control the discharged air volume level dependently controlled to the maximum air volume level by the maximum air volume level entry leader, according to an auto mode selected by a user.

* * * * *